Aug. 23, 1960     K. A. KLINGLER     2,949,788
SLEEVE PACKING

Filed Oct. 3, 1957     3 Sheets-Sheet 1

INVENTOR
KARL A. KLINGLER
PARKER & CARTER
ATTORNEYS

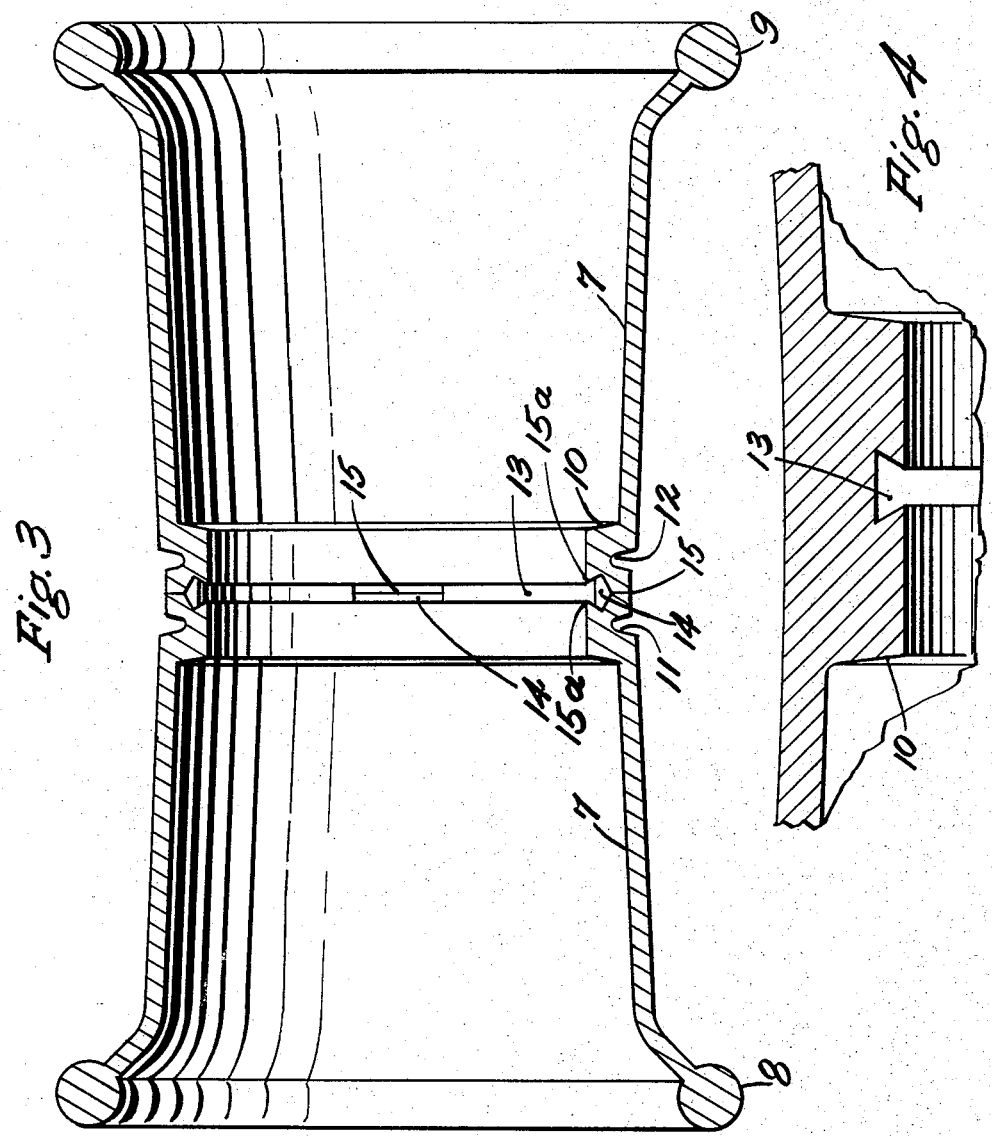

Aug. 23, 1960 K. A. KLINGLER 2,949,788
SLEEVE PACKING
Filed Oct. 3, 1957 3 Sheets-Sheet 3

Inventor
Karl A Klingler
by Parker & Carter
Attorneys

2,949,788
SLEEVE PACKING

Karl A. Klingler, 111 S. Wright St., Naperville, Ill.

Filed Oct. 3, 1957, Ser. No. 688,039

3 Claims. (Cl. 74—18.2)

My invention relates to an improvement in sleeve packing and has for one object to provide a packing usable with reciprocable plungers, piston rods, pistons and the like which will, with a minimum of resistance to relative longitudinal movement of the elements between which the packing is located, provide a positive bar to fluid movement past the packing.

Another object is to provide a packing where a high differential pressure on opposite sides of the packing can be supported and where the pressure supported by the packing will have minimum effect on the frictional resistance caused by the presence of the packing.

Other objects will appear from time to time in the course of the specification and claims.

My invention is illustrated more or less diagrammatically in the accompanying drawings, wherein—

Figure 3 is a longitudinal section through the packing sleeve before assembly;

Figure 4 is a section along line 4—4 of Figure 2.

Like parts are indicated by like characters throughout the specification and drawings.

Figure 1:
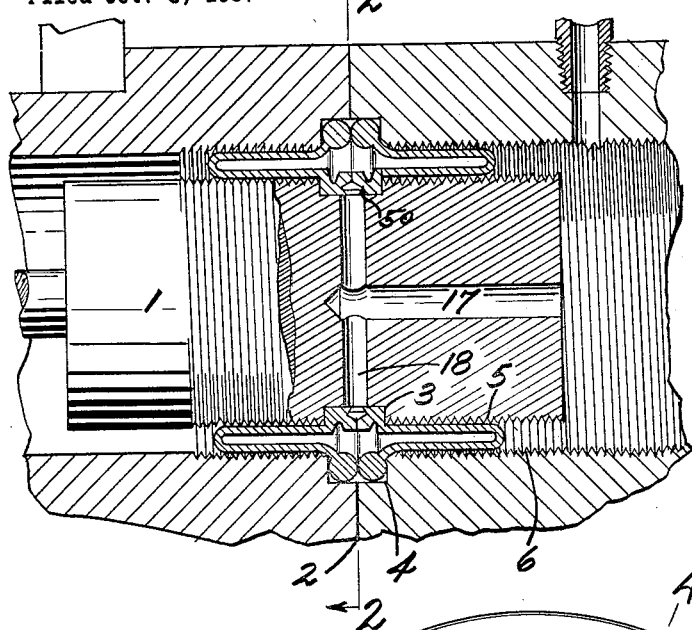
Figure 1 is a longitudinal section through a plunger, cylinder and packing sleeve.
Figure 2:
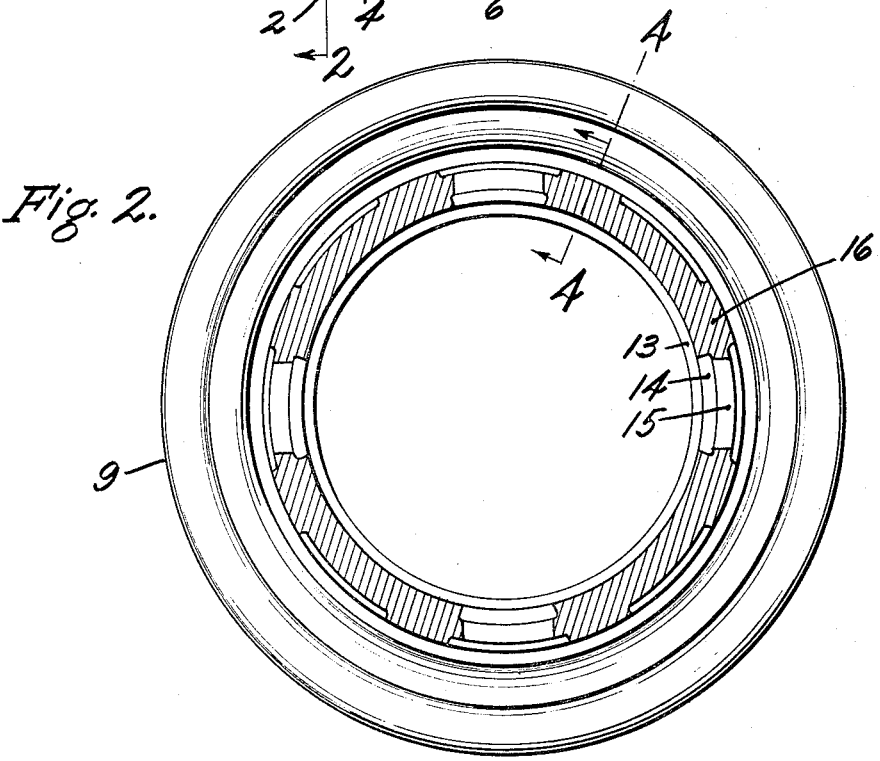
Figure 2 is a section along the line 2—2 of Figure 1.

The cylindrical plunger 1 is mounted for reciprocation in the cylinder body 2. Annular grooves 3 and 4 of rectangular cross section are defined in the outer periphery of plunger 1 and in the opposed inner periphery of cylinder 2. The opposed inner and outer surfaces of cylinder and plunger are scarified, corrugated or otherwise roughened as at 5, 6 on both sides of the grooves 3 and 4. The roughness may take the form of five spiral threads as illustrated but other friction increasing means may well be used.

Figure 3 shows the flexible elastic packing sleeve before assembly, it may be of rubber, plastic or other elastomeric material but must be immune to attack and deterioration in the presence of the fluids to be resisted by the packing.

The tubular generally cylindrical sleeve 7 is flared and terminates at each end in reinforcing rings 8, 9 generally cylindrical in cross section and substantially thicker than the wall of the sleeve. At the mid-point, the point of minimum diameter, there is a relatively thick inwardly extending reinforcing belt 10. Arranged about the outer periphery of the sleeve in general alignment with the belt 10 are a plurality of pairs of spaced parallel pockets 11, 12 extending inwardly into the sleeve a distance greater than the wall thickness. Under some circumstances the pockets 11, 12 may contain garter spring or other biasing spring means which will encircle the sleeve to reinforce the hold of the elastomeric ring against the plunger. The sleeve 7 is reduced in outer diameter between the pockets 11, 12.

A trapezoidal channel 13 extends completely about the inner periphery of the belt 10. At one or more places about the periphery of the sleeve, trapezoidal valve pockets 14 are formed in the belt 10 open to the channel 13 and in register with such pockets, valve slits 15 extend through the belt 10 from the pockets 14 through the sleeve 7 between the pockets 11, 12. Reinforcing ribs 16 are formed in the belt 10 between the pockets.

The slits 15 are free to open to permit radial flow through the belt 10 but pressure from the outside of the sleeve will urge the flexible walls together so that the slits can function as check valves.

When the sleeve 7 is to be installed as a packing, it will be threaded on the plunger 1 with the belt 10 seating in the groove 3. The opposed sleeve ends will be folded back toward the belt until the reinforcing rings 8 and 9 come together, this being possible because of the tapering shape of the sleeve. The reinforcing rings will be snugly seated in the groove 4. Thus the elastomeric sleeve will be anchored both in the plunger and the cylinder with the opposed roughened surfaces engaged by the sleeve.

A hydraulic fluid may then be forced through channel 17 and radial branches 18 in the plunger along the trapezoidal channel 13 to pockets 14 through the slits or check valves 15 into the annular bag defined by the sleeve 7 to fill the bag, expand its opposite walls into intimate interlocking contact with the opposed rigid faces of plunger 1 and cylinder 2 and also to upset and expand the belt 10 and the rings 8 and 9 into their appropriate grooves. Pressure to inflate the bag may well come through the plunger 1 from the high side of a pump chamber diagrammatically illustrated, or if desired, from any other convenient source.

As plunger 1 reciprocates, the bag walls roll into and out of contact with the opposed plunger and cylinder surfaces with a minimum of friction and without leakage.

The roughened surfaces engaged by the bag walls prevent slip of the walls along its rough surfaces and as the walls roll onto and off of the surfaces, the roughness adds no friction to resist plunger and packing movement but provides friction to prevent the blowing out of the bag, even if no reinforcement of the bag is provided. If desired, the bag may be reinforced by built in reinforcement, usual to reinforced rubber structures.

The space between the opposed parallel bag walls may be very small but there will be no contact between them as they are held apart by the hydraulic pressure of the fluid filling the bag and the only resistance to movement of the plunger is the hydraulic friction of the bag filling fluid and the resistance to bending of the bag wall as it rolls off one surface onto the other.

Figure 5:
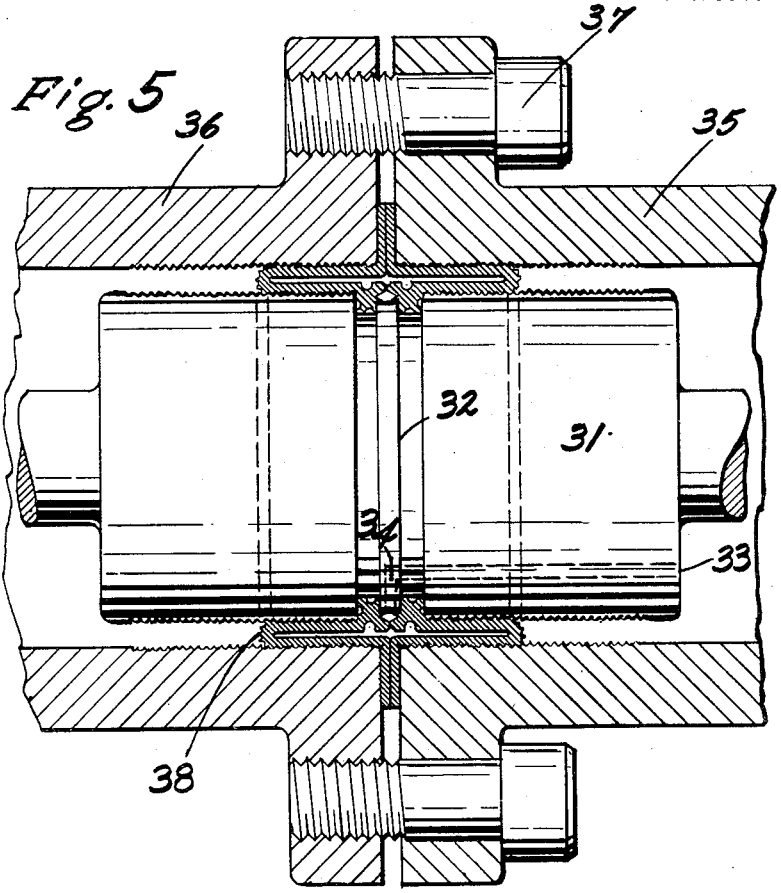
Figure 5 is a section similar to Figure 1 through a modified form.
Figure 6:
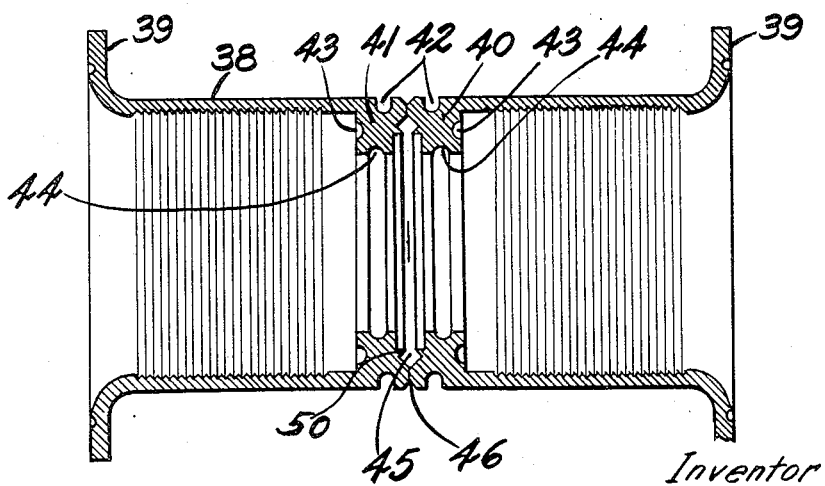
Figure 6 is a section similar to Figure 3 through the packing sleeve of Figure 5.

Referring to the modified form shown in Figures 5 and 6, the plunger 31 has a groove 32. A duct 33 leads axially through the plunger to connect a radial duct 34, which opens into the groove 32. Thus the pressure on one side of the piston and valve and of course normally the high pressure side is transmitted to the interior of the bag so that the pressure in the bag and the pressure against which the bag seals are automatically maintained in consonance. The important thing is that the pressure be sufficient to effect the seal. Even though the pressure may be lower on the outside of the seal, that will be taken care of by the strength of the bag but if the pressure in the bag is too low, the seal will not be tight. The plunger 31 reciprocates in the cylinder defined by the cylindrical bodies 35 and 36 flanged and held together by cap screws 37.

38 is an elastomeric sleeve, the inner walls of which are serrated. The outer ends of the sleeve are flanged at 39 and as positioned in Figure 5, they are folded back upon each other so that the two flanges 39 are gripped between the two ends of the cylindrical members 35 and 36, the pressure of the cap screws 37 holding them tightly together. Intermediate the ends of the sleeve 38 are two relatively heavy reinforcing rings 40, 41, each grooved exteriorly as indicated at 42 and grooved interiorly as indicated at 43 and 44. An annular channel 45 is defined between these two reinforcing rings 40 and 41 in register with the radial duct 34. These two rings 40 and 41 are seated in parallel grooves divided by the rib 32, the contour of which is concave. Spaced tangentially about the groove 45 are slits 46 so that in the position shown in Figure 5, pressure entering through the piston 31, ducts 33 and 34 to channel 45 which is defined by the two rings and the rib 32 so that the pressure entering through the ducts 33 and 34 is exerted around the entire periphery through slits or slots 46 may enter the space within the bag formed by the folded back sleeve ends and inflate the sleeve to furnish a tight seal. The ducts are connected with channel 45 by an annular groove 51. Preferably the sleeve is one-piece. Under some circumstances it would be possible to get the same result if two separate sleeves were defined by cutting away between the shoulders or reinforcing rings 40 and 41. Pressure inside the bag being under those circumstances relied upon to hold the annulus or rings 40 and 41 seated and against one another.

In order to insure against leakage, self-sealing, thin lips 15a and 50 are provided. These lips will be pressed by the pressure of the fluid against the surface 32 or against the plunger 1 to insure a tight seal.

I claim:

1. A packing sleeve for reciprocating parts comprising a single elastomeric sleeve outwardly flanged at its ends, two reinforcing sealing rings integral therewith joined together along a radial plane adjacent the center of the sleeve, there being a valve slot extending radially of the sleeve at the plane of juncture of the two rings.

2. A packing sleeve for reciprocating parts comprising a single elastomeric sleeve outwardly flanged at its ends, two reinforcing sealing rings integral therewith joined together along a radial plane adjacent the center of the sleeve, there being a valve slot extending radially of the sleeve at the plane of juncture of the two rings, the inner periphery of the sleeve being serrated, the serrations comprising a multiplicity of continuous uninterrupted parallel grooves in parallel planes perpendicular to the axis of the sleeve.

3. A packing sleeve for reciprocating parts comprising a single elastomeric sleeve outwardly flanged at its ends, two reinforcing sealing rings integral therewith joined together along a radial plane adjacent the center of the sleeve, there being a valve slot extending radially of the sleeve at the plane of juncture of the two rings, the inner periphery of the sleeve being serrated, the serrations comprising a multiplicity of continuous uninterrupted parallel grooves in parallel planes perpendicular to the axis of the sleeve, the sleeve ends being adapted to be telescoped back on one another to bring the opposed faces of the flanges together encircling the sealing rings adjacent their plane of contact to define an annular pressure sack.

References Cited in the file of this patent

UNITED STATES PATENTS

| | | |
|---|---|---|
| 714,243 | Sargent | Nov. 25, 1902 |
| 1,876,455 | Inshaw | Sept. 6, 1932 |
| 2,145,189 | Nathan | Jan. 24, 1939 |
| 2,148,101 | Brucker | Feb. 21, 1939 |
| 2,757,542 | Klingler | Aug. 7, 1956 |
| 2,864,258 | Klingler | Dec. 16, 1958 |
| 2,870,638 | Klingler | Jan. 27, 1959 |

FOREIGN PATENTS

| | | |
|---|---|---|
| 324,518 | France | April 3, 1903 |
| 118,901 | Switzerland | Feb. 16, 1927 |
| 456,103 | Germany | Feb. 16, 1928 |